United States Patent [19]
Harris et al.

[11] 3,712,122
[45] Jan. 23, 1973

[54] AIRCRAFT HARD LANDING INDICATOR

[75] Inventors: Carl L. Harris, Kirkland, Wash.; Leighton C. Rama, Bellevue, Wash.; Dallas V. Soward, Seattle, Wash.

[73] Assignee: Electro Development Corporation, Lynnwood, Wash.

[22] Filed: Feb. 8, 1971

[21] Appl. No.: 113,121

[52] U.S. Cl. .......................73/88.5 R, 73/12, 73/492
[51] Int. Cl. ................................................G01l 3/00
[58] Field of Search ..........73/11, 12, 65, 492, 178 T, 73/88.5 R; 177/136; 116/114 AH

[56] References Cited

UNITED STATES PATENTS

| | | | |
|---|---|---|---|
| 3,517,550 | 6/1970 | Leventhal | 73/88.5 R |
| 2,587,628 | 3/1952 | King | 73/11 |
| 2,774,535 | 12/1956 | Anderson | 73/88.5 R X |
| 3,273,382 | 9/1966 | Fonash | 73/12 X |
| 3,354,703 | 11/1967 | Russell, Jr. et al. | 73/88.5 R |
| 3,464,259 | 9/1969 | Farr | 73/88.5 R |

Primary Examiner—Charles A. Ruehl
Attorney—Christensen & Sanborn

[57] ABSTRACT

An apparatus for indicating when an aircraft has been subjected to an abnormal or "hard" impulse upon landing comprises a plurality of force sensors, each force sensor being disposed to provide an output signal proportional to the instantaneous ground contact force exerted upon one landing gear of the aircraft. The plurality of output signals provided by the sensors are amplified and supplied to a corresponding plurality of indicator circuits. Included in each indicator circuit is at least one level detector which provides an output to light an indicator lamp if the value of the output signal supplied thereto equals or exceeds a predetermined threshold value. In a preferred embodiment, each indicator circuit comprises a plurality of level detectors responsive to different threshold values. If a second, greater threshold value is exceeded during a predetermined time interval following traversal of a first, lesser threshold value, an output is provided by the indicator circuit to light the indicator lamp. The force threshold values and time interval which comprise an abnormal landing impulse are arrived at by structural analysis of the entire aircraft.

10 Claims, 6 Drawing Figures

PATENTED JAN 23 1973

INVENTORS
CARL R. HARRIS
LEIGHTON C. TRANA
BY DALLAS V. SOWARD

Christensen & Sanborn
ATTORNEYS

PATENTED JAN 23 1973

INVENTORS
CARL R. HARRIS
LEIGHTON C. RANA
BY  DALLAS V. SOWARD

Christensen & Sanborn
ATTORNEYS

AIRCRAFT HARD LANDING INDICATOR

Field of the Invention

This invention generally relates to aircraft weight and balance systems, and, more particularly, to a system for comparing the actual landing impulse to which an aircraft is subjected with a predetermined abnormal value thereof.

BACKGROUND of the INVENTION

When an aircraft lands and ground contact is made, the aircraft is subjected to an impulse through its landing gear. This impulse includes a force component which is transmitted to the remaining structural elements of the airplane. The force component, although less than the actual ground contact force due to damping action of the aircraft's shock absorbers and landing gear geometry, nevertheless may be sufficient to cause structural damage, either by failure of one or more of the aircraft's major components or structural connections.

For example, the aircraft's landing gear is designed to withstand a much larger force component upon ground contact than a number of other elements, such as the wings, or the engine nacelle struts. If a "hard" landing occurs, the force component may cause the aircraft's wings to oscillate through a fairly large arc and overstress the connections of the wings to the fuselage. Likewise, the connections of the engine nacelle struts to the wings may be overstressed.

If structural damage does occur due to a hard landing, the aircraft may be unsuitable for further flight until the damage has been repaired. Because of safety considerations, it is important that the aircraft be inspected every time a "hard" landing occurs.

Presently, both the criteria for determining when a "hard" landing has occurred, and the implementation of those criteria in specific situations, have been left to the intuition and judgment of the aircraft's pilot and flight crew. Because these personnel are not entirely familiar with the structural limits of the aircraft, the instances in which they have reported a hard landing have not corresponded to many causes of actual structural damage. In addition, there is probably a personal reluctance to report an actual "hard" landing, whatever the cause, for the possible implication of error on the crew's part.

It is therefore an object of this invention to provide an apparatus for determining when an aircraft has been subjected to an abnormal or hard impulse upon landing.

It is a further object of this invention to provide an apparatus for indicating the severity or degree of the impulse to which the aircraft has been subjected upon landing.

It is another object of this invention to provide an apparatus in which the indication of a "hard" landing is retained, even though the aircraft power has been turned off, until manually reset.

SUMMARY OF THE INVENTION

These objects and others, which will be apparent from a consideration of the remaining portion of the specification and claims, are achieved from the discovery that the aircraft's weighing system, embodied in force sensors on each landing gear thereof, can be used to monitor the ground contact force upon landing, and from a method and apparatus for comparing this ground contact force with a first threshold value thereof, during a time period initiated when the ground contact force exceeds a second threshold value, to provide a visible indication when the threshold first value has been exceeded.

BRIEF DESCRIPTION OF THE DRAWINGS

The invention perhaps can best be understood by a consideration of the following portion of the specification, taken in conjunction with the accompanying drawings in which.

DESCRIPTION OF A PREFERRED EMBODIMENT

Figure 1:
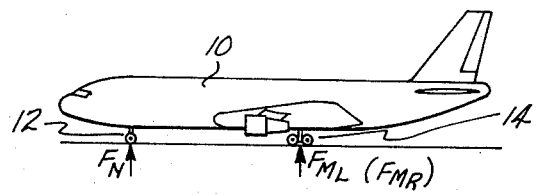
FIG. 1 is a pictorial view of an aircraft showing the ground contact forces upon landing.

With particular reference now to FIG. 1, an aircraft 10 includes a nose landing gear 12 and a pair of main landing gears 14, only one of which is illustrated. Upon landing, the nose landing gear 12 is subjected to a ground contact force $F_N$ and the left and right main landing gears 14 are respectively subjected to ground contact forces of $F_{ML}$ and $F_{MR}$.

Figure 2:
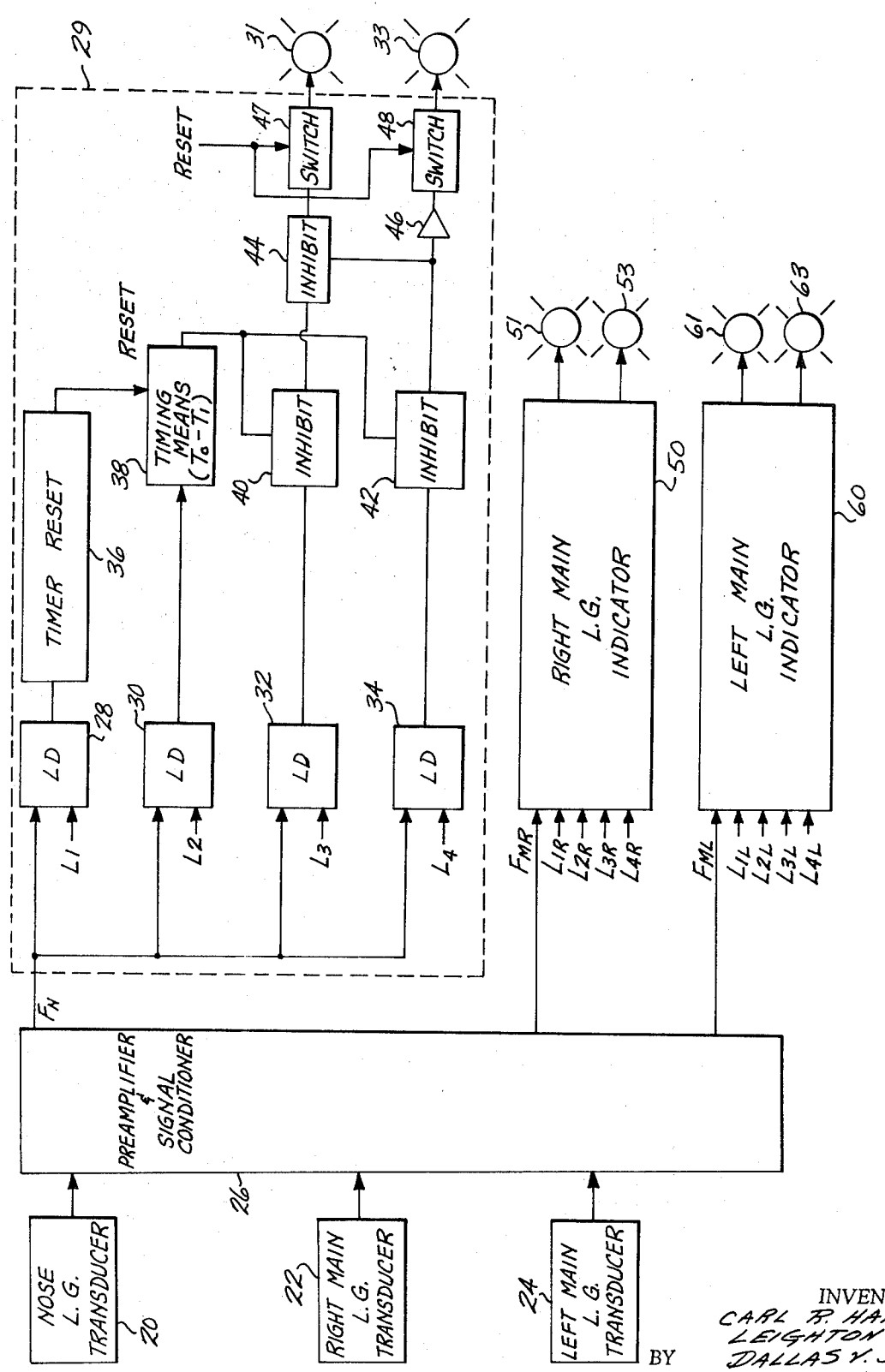
FIG. 2 is a block diagram of one embodiment of the apparatus of this invention.

With reference now to FIG. 2, these ground contact forces are sensed by a plurality of transducers 20, 22 and 24 associated with the nose landing gear 12 and the right and left main landing gears 14, respectively. The transducers 20, 22 and 24 may be of any type which provides an output signal proportional to the ground contact force exerted on its associated landing gear. One embodiment of such a transducer is seen in U.S. Pat. No. 3,521,484, Dybvad et al., in which a plurality of transducer elements are disposed inside the landing gear's axle so as to measure the shear force therein upon ground contact. Another embodiment may be seen in U. S. Pat. No. 3,464,259, Farr, in which the transducer means are mounted on lugs on the outside of the axle. Both of these patents are assigned to the assignee of the present invention.

Normally, transducers of this kind are used to sense the aircraft's weight when the aircraft is stationary on the ground. The present invention results in part from the discovery that the transducers also can be used to sense the ground contact force upon landing.

The signals from transducers 20, 22 and 24 are fed to a preamplifier and signal conditioner 26 which produces therefrom signals $F_N$, $F_{MR}$ and $F_{ML}$, which are proportional to the above-mentioned ground contact forces. Circuit 26 functions to raise the amplitude of the signals from the transducers to a level suitable for use in the remaining circuitry of the apparatus. In amplification, the signals from the transducers are normalized so that an incremental change in amplitude thereof is always proportional to the same incremental change in ground contact force. In addition, the circuit 26 may modify the transducer signals by a factor proportional to the actual amplitude of the power supply voltage. This factor, also known as the system reference, also is applied to the remaining signals in the system so that the operation thereof is independent of variations in the power supply voltage.

The output signal $F_N$ from circuit 26 is coupled to the input of a nose landing gear indicator means 29, and the output signals $F_{MR}$ and $F_{ML}$ are coupled to right main landing gear indicator means 50 and left main landing gear indicator means 60, respectively. The indicator means 29, 50 and 60 are identical, and only indicator means 29 will be described in detail.

A plurality of level detectors 28, 30, 32 and 34 are provided therein. The signal $F_N$ is coupled to one input of each of these level detectors, and the other inputs are supplied with signals $L_1$, $L_2$, $L_3$ and $L_4$, respectively, which have a predetermined threshold magnitude. The operation of detectors 28 – 34 is identical: an output is provided therefrom throughout the time when the input signal $F_N$ equals or exceeds the threshold magnitude of the L signal. For example, level detector 28 provides an output whenever the magnitude of signal $F_N$ equals or exceeds the threshold magnitude established by signal $L_1$. As will be explained in more detail hereinafter, the plurality of level detectors 28 – 34 allow the system to respond to the impulse value encountered during landing, as well as to various degrees of ground contact force.

Analysis of aircraft has shown that structural damage is likely to occur if a predetermined impulse has been exceeded upon landing. As is known, an impulse comprises both a force component and a time component, such that the impulse is equal to the product thereof.

In the simplest case, a "hard" or abnormal landing may be defined to occur when the ground contact force exceeds a predetermined value, notwithstanding the time over which the ground contact force is applied. In another case, a "hard" or abnormal landing may be defined to occur when the ground contact force exceeds a predetermined value over a predetermined time interval. The circuitry within indicator means 29 provides an output for either of these conditions.

Specifically, the output of level detector 28 is coupled through a timer reset circuit 36 to the reset input of a timing means 38. An input is provided to timing means 38 from the output level detector 30, and timing means 38 in turn control signals to inhibit circuits 40 and 42 which receive inputs from the outputs of level detectors 32 and 34, respectively. The output of inhibit circuit 42 is coupled as a control signal to the inhibit input of a third inhibit circuit 44, which receives its input from inhibit circuit 40. The output of inhibit circuit 42 is also coupled through an amplifier 46 and a switch 48 to an indicator lamp 33, and the output of inhibit circuit 44 is coupled through a switch 47 to an indicator lamp 31. Both switches 47 and 48 receive a reset signal from a manually-operated reset means to be described hereinafter.

Figure 3:
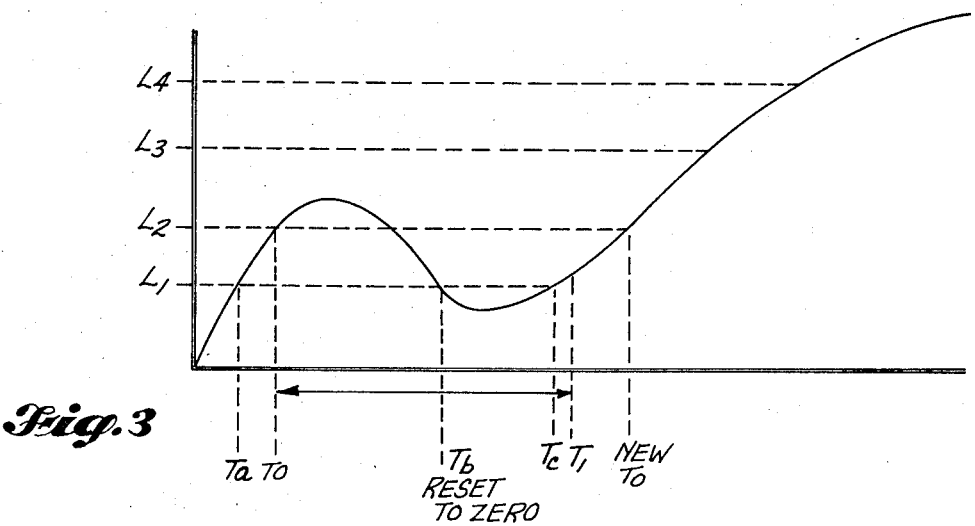
FIGS. 3, 4, 5 and 6 are graphs showing typical variations in ground contact force with time during landing.
Figure 4:
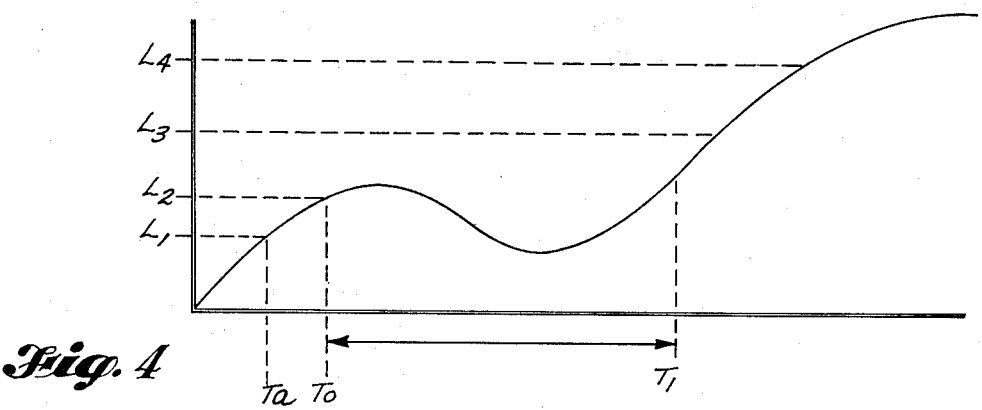
Figure 5:
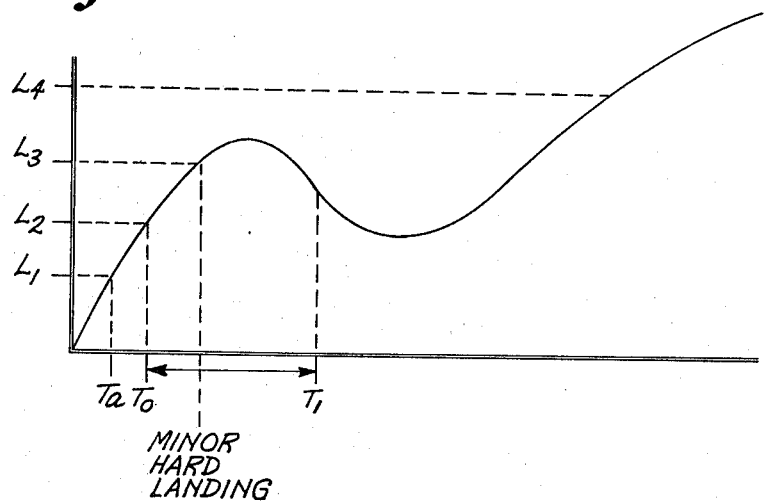
Figure 6:
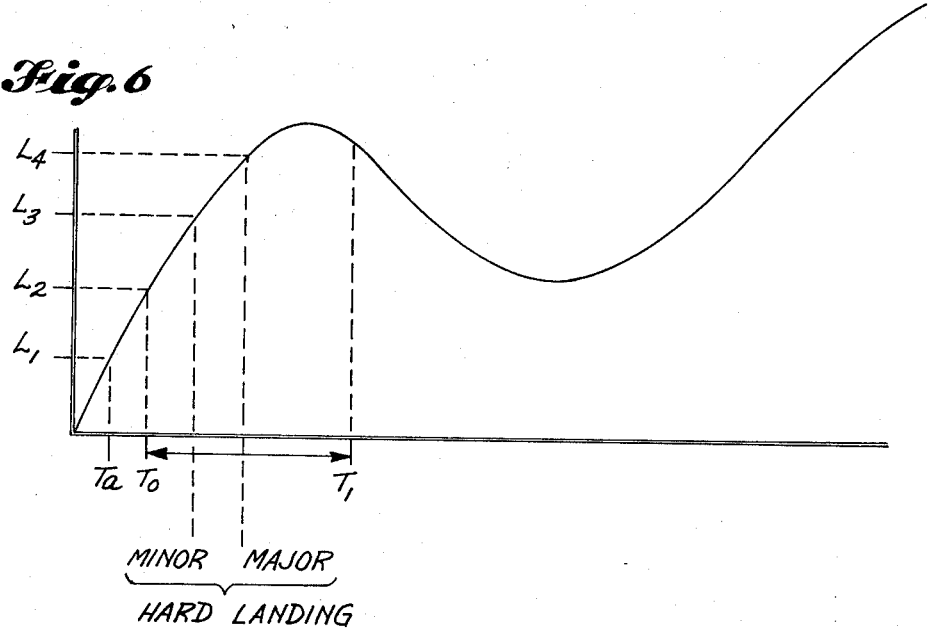

To understand the operation of indicator means 29, reference should be made to FIGS. 3 – 6 which illustrate typical variations in ground contact force with time, over a landing interval. FIGS. 3 and 4 illustrate the ground contact force for two illustrative landings, wherein the landing impulse is within acceptable limits, and FIGS. 5 and 6 illustrate the ground contact force for two other illustrative landings, wherein the landing impulse is beyond acceptable limits.

The curve in FIG. 3 can be divided into three characteristic regions. The first of these regions is represented by a rapid increase of the ground contact force from zero to a first peak value. This rapid increase occurs immediately after the initial impact of the aircraft's landing gear with the ground. In the second region, the ground contact force decreases from this first peak value to a minimum value, and then begins to increase again. The initial impact of landing has subsided and is offset somewhat by lift provided to the aircraft by its wings. As the aircraft's ground speed decreases, the lift also decreases so that ground contact force begins to increase in the manner indicated. In the third region, the wing lift is lost and the aircraft begins to settle on its landing gear so that its weight becomes the predominant component of ground contact force.

The curves in FIGS. 4, 5 and 6 also show three characteristic regions. However, the maximum and minimum values encountered in the first and second regions, as well as the time duration thereof, differ significantly. It is this difference which is detected by the circuitry of the indicator means 29. In each case, the magnitude and shape of the curve in the third region is similar and thus the third region is not a significant element in the determination of abnormal landing impulse.

The threshold magnitudes $L_1 - L_4$ are indicated on the curves in FIGS. 3 – 6. The function of timer reset circuit 36 is to provide an output whenever no output is provided by level detector 28. Thus, with reference to FIG. 3, timer reset circuit 36 provides an output from time 0 to time $T_a$ in the first region, and from time $T_b$ to time $T_c$ when the ground contact force $F_N$ drops below the magnitude of $L_1$. In FIGS. 4, 5 and 6, timer reset circuit 36 provides an output only during the time interval $0 - T_a$ in the first region of the curves therein.

The function of timing means 38 is to provide no output signal for a predetermined time $T_1$ after the application of an output signal from level detector circuit 30 at time $T_0$ when $F_N$ equals or exceeds the magnitude of $L_2$. This time interval is seen in each of FIGS. 3 – 6 and corresponds to the expected time component of any hard landing impulse that would be present at the nose landing gear 12. The value of $L_2$ and the duration of the time interval $T_0 - T_1$ are chosen so that the level detectors 32 and 34 are enabled only during the major portion of the first and second regions of the ground contact force characteristic curve. To this end, timing means 38 provides a control signal before $T_0$ and after $T_1$ to the inhibit inputs of circuits 40 and 42 so as to prevent any operation thereof. Therefore, a "hard" landing indication is provided if, and only if, the magnitudes of $L_3$ or $L_4$ are exceeded during the time interval $T_0 - T_1$. In other words, the circuitry defines a predetermined "window" or "gate", during $T_0 - T_1$ in which the magnitudes of the ground contact force is compared with certain threshold values.

With particular reference to FIG. 4, it can be noted that the ground contact force $F_N$ does not equal the magnitude of $L_3$ until well into the third region of the curve, and corresponds primarily to the aircraft's weight acting through the nose landing gear 12. Since the threshold value of $L_3$ was not equaled or exceeded during the first and second regions of the characteristic landing curve, defined by the gate $T_0 - T_1$, no output is provided by the indicator means 29. However, in FIG. 5, the ground contact force $F_N$ exceeds the magnitude of $L_3$ after time $T_0$ but before time $T_1$. Similarly, in FIG. 6, both the magnitudes of $L_3$ and $L_4$ are exceeded within the time interval $T_0 - T_1$. In each of these cases, an output is provided by indicator means 29 to signify the occurrence of an abnormal or "hard" landing.

The function of the circuitry including level detector 28, and timer reset circuit 36 is to reset the timing means 38 should the level of the ground contact force decrease below that of $L_1$ during the landing interval. The level of $L_1$ may be chosen to approximate the value that is likely to occur should the aircraft bounce on landing such that the landing gear momentarily loses ground contact. In this situation, it is desirable to reset the circuitry so as to enable detection during subsequent ground contacts.

The value of $L_3$ may be considered as a "minor" hard landing requiring certain considerations and structural analysis, and the value of $L_4$ may be considered as a "major" hard landing requiring different considerations. In order to provide separate indication of these degrees of hard landing, the indicator lamp 31 is energized by the output from inhibit circuit 40, through inhibit circuit 44 and switch 47, whenever the level of $L_3$ has been equaled or exceeded. However, if the level of $L_4$ has also been equaled or exceeded during the time interval $T_0 - T_1$, inhibit circuit 42 provides an output to actuate inhibit circuit 44, so as to de-energize indicating lamp 31. At the same time, indicator lamp 33 is energized through amplifier 46 and switch 48.

When the aircraft is shut down and power removed from the components of FIG. 2, the signals just described are removed. To insure that the hard landing indication is noted by appropriate personnel, the switches 47 and 48 are placed in a latched condition when an input signal is supplied thereto until a reset signal is supplied thereto. This reset signal is preferably obtained from a manually-operated switch not illustrated.

In a similar manner, indicator means 50 and 60 for the right and left main landing gears 14 provide outputs to indicator lamps 51, 53, 61 and 63 when minor and major "hard" landings are detected thereby.

The threshold magnitudes $L_{1R} - L_{4R}$ and $L_{1L} - L_{4L}$ for the indicator means 50, 60, and the values $L_1 - L_4$ for indicator means 29, as well as the durations of the time intervals $(T_0 - T_1)$ provided therein, can be arrived at by independent structural analysis of the aircraft. Preferably, this analysis is carried out by the manufacturer of the airframe and includes analysis of the transfer function between the ground contact force exerted on each landing gear and the actual force component transmitted to the structural elements of the airframe, together with stress analysis in light of the actual force component. As mentioned previously, each of the time intervals $(T_0 - T_1)$ is chosen to correspond roughly to the expected duration of the first and second regions in the characteristic associated curve of ground contact force.

The circuitry shown in FIG. 2 is preferably embodied in well-known solid state components. The level detectors 28 – 34 may be simple threshold devices. The timer reset circuit 36 may be a simple switch which is latched in one state whenever no output is provided by the level detector 28. The timing means 38 may comprise a combination of an input switch, a delay circuit, and an output switch, in which the input switch is actuated in response to an output from level detector 30, and in which the output switch is actuated to apply a signal to the delay circuit, at time $T_0$ by the signal from the delay circuit at a predetermined time $T_1$ after the time $T_0$. The reset function thereof may be accomplished by turning off the input switch and providing a discharge path for the delay circuit.

Inhibit circuits 40 and 42 may be identical and provide an output whenever a signal is received from the associated level detector, except when a signal previously has been applied to the inhibit inputs thereof. Inhibit circuits 40 and 42 preferably include at least one driver stage to raise the amplitude of the signal obtained from the associated level detector.

Amplifier 46 may comprise a simple driver stage. Inhibit element 44 should provide an output whenever an input is received from inhibit circuit 40, except whenever a signal is being applied to the inhibit input thereof from inhibit circuit 42. Inhibit circuit 44 also preferably includes at least one driver stage. Switches 47 and 48 may comprise simple electromechanical relays having a latched state when actuated which is maintained until reset, even if power is removed from the actuating coil thereof.

Therefore, it should be evident to those skilled in the art that the invention is not limited to the specific embodiment described, but rather is intended to be bounded only by the limits of the appended claims.

What is claimed is:

1. A system for indicating when an aircraft having at least one landing gear has been subjected to a predetermined impulse value upon landing, comprising:
   a. transducer means providing an output signal which is proportional to the ground contact force exerted on said landing gear,
   b. means producing a first signal when said output signal equals or exceeds a first threshold value,
   c. timing means producing an inhibit signal except for a predetermined time after the production of said first signal,
   d. means producing a second signal when said output signal equals or exceeds a second threshold value which is greater than said first threshold value,
   e. indicator means responsive to said second signal, and
   f. means inhibiting the operation of said indicator means in response to said inhibit signal.

2. A system as recited in claim 1, further comprising:
   a. means producing a third signal when said output signal equals or exceeds a third threshold value which is greater than said second threshold value,
   b. a second indicator means responsive to said third signal, and
   c. means inhibiting the operation of said second indicator means in response to said inhibit signal.

3. A system as recited in claim 2, further comprising means inhibiting the operation of said first indicator means in response to said third signal.

4. A system as recited in claim 1, further comprising:
   a. means producing a reset signal when said output signal drops below a threshold value which is less than said first threshold value, and
   b. means resetting said timer means in response to said reset signal to allow the production of said inhibit signal thereby.

5. A system as recited in claim 1, further comprising switch means coupled to said indicator means for latching said indicator means in an energized state in response to said second signal, and means for manually resetting said switch means to de-energize said indicator means.

6. The system as recited in claim 1, wherein said transducer means is of the type that measures ground contact force as a function of the landing gear's shear deflection force.

7. A system for indicating when an aircraft having a plurality of landing gear has been subjected to a predetermined impulse value upon landing, comprising:
   a. a plurality of transducer means, each transducer means providing an output signal which is proportional to the ground contact force exerted on one landing gear of the aircraft,
   b. a plurality of indicator circuits, one indicator circuit being provided for each transducer means, and each including
      i. means producing a first signal when the output signal from the associated transducer means equals or exceeds a first threshold value,
      ii. timing means producing an inhibit signal except for a predetermined time after the production of said first signal,
      iii. means producing a second signal once said output signal equals or exceeds a second threshold value which is greater than said first threshold value,
      iv. indicator means responsive to said second signal, and
      v. means inhibiting the operation of said indicator means in response to said inhibit signal.

8. The system as recited in claim 7, wherein each of said transducer means is of the type that measures ground contact force as a function of the landing gear's shear deflection force.

9. An apparatus for detecting when an aircraft having at least one landing gear has been subjected to an excessive impulse upon landing, comprising:
   a. means detecting the actual landing force exerted on said landing gear,
   b. means comparing said actual landing force over a given period of time with a first predetermined force value,
   c. means enabling said comparing means when said actual landing force exceeds a second predetermined force value which is less than said first predetermined force value, and
   d. means providing an output signal when said actual landing force equals or exceeds said first predetermined force value within said time period.

10. A method of obtaining an indication of whether an aircraft has been subjected to an abnormal impulse upon landing comprising the steps of:
   a. measuring the actual ground contact force exerted on at least one landing gear of the aircraft,
   b. comparing said actual ground contact force with a first predetermined value thereof during a predetermined period initiated when said actual ground contact force exceeds a second predetermined value thereof, said second value being less than said first value, and
   c. providing an indication when said first value has been exceeded.

* * * * *